ର
3,316,099
PREPARATION OF SYNTHETIC MEAT FLAVOR AND THE REACTION PRODUCT
Theodore M. Hoersch, Park Forest, Ill., assignor to Swift & Company, Chicago, Ill., a corporation of Illinois
No Drawing. Filed Apr. 28, 1965, Ser. No. 451,608
8 Claims. (Cl. 99—140)

Generally, the present invention relates to a synthetic meat flavor and to its method of preparation, and more specifically to the preparation of a synthetic meat flavor by the reaction of a nitrite with a mixture of amino acids.

There have been various attempts in the past to produce a non-meat product which would impart a desirable meat flavor to vegetable materials as well as to meats. Synthetic meat flavors have been prepared by reacting various amino acids with furans, glyceraldehyde or monosaccharides. These former methods, however, resulted in a product having various undesirable characteristics, such as a strong sulfur odor due to the caramelization reaction, or Maillard condensation. Thus, the prior methods have met with only a slight degree of commercial success. There is therefore a need at the present time for a synthetic meat flavor which will impart a desirable flavor to meats and vegetables.

Therefore, it is an object of this invention to prepare an improved synthetic meat flavor.

It is a further object to provide an improved process for preparing a synthetic meat flavor.

It is another object of this invention to prepare a synthetic meat flavor by the reaction of a nitrite with a mixture of amino acids.

It is another object of this invention to prepare a synthetic meat flavor which is free from undesirable sulfur odors due to caramelization.

Additional objects of this invention if not specifically set forth herein will be readily apparent to those skilled in the art from the following detailed description of the invention.

Generally, the present invention relates to a process for preparing a synthetic meat flavor which comprises the reaction of various amino acids with a nitrite under a semi-impermeable layer of an oil.

More specifically, the present invention comprises dissolving a nitrite with a mixture of various amino acids, adjusting the pH of the resultant solution, covering the solution with an oil, and reacting the nitrite and the amino acids under elevated temperature and pressure conditions.

The amino acid mixture used in the present invention may vary widely in regard to the kind and number of amino acids used, as well as the percentages of these acids which are employed. However, there are noticeable differences in the flavors which result from various amino acid mixtures, some flavors naturally being more preferred than others. On the basis of many experiments involving varying amino acid mixtures, it has been concluded that best results are obtained with mixtures which include the following amino acids: aspartic acid, glycine, histidine, glutamic acid, valine, proline, and cysteine. A combination of these 7 amino acids, either alone or in the presence of additional amino acids, results in a flavor which is a significant improvement over other mixtures of amino acids which have been attempted. However, other mixtures do result in usable flavors, although they are not as desirable as the flavor resulting from the above-mentioned combination.

It should also be quite evident to one skilled in the art that either the D or L isomers of the amino acids or mixtures thereof, may be used in the preparation of the product.

Although the reaction of nitrites with the amino acids may be conducted over a wide pH range, most satisfactory results have been experienced in the pH range of from about 5 to about 8, with optimum results being obtained at about pH 6.

In order to obtain the desired reaction, it is necessary that the solution of the nitrite and amino acid mixture be subjected to a temperature and pressure combination which is at least equal to 120° C. and 15 pounds pressure for at least 0.5 hour. Although a longer reaction time may be employed, optimum results are obtained at 1.5–2 hours. In the absence of the above minimum temperature and pressure conditions, no flavor is produced from the combination of the nitrite and amino acid mixture. For example, it has been found that the desired result is not obtained when the solution is refluxed at its boiling point under normal atmospheric conditions, approximately 100° C., for prolonged periods of time, even as high as 10 hours.

As previously mentioned, the desired reaction must be conducted under a semi-impermeable layer of an oil. The thickness of this oil layer is not critical, and as long as an oil-water interface is present to some extent the flavor is produced. Although the exact function of the oil layer is not known, it is probable that the oil layer holds some of the volatile reaction products in solution and may absorb some of the reaction products, and in addition limits the combination of atmospheric oxygen with the reaction solution. Generally, oils of animal origin have been found to be most desirable for this purpose. However, animal fats and oils would not be workable in those instances where a non-meat containing flavor was desired; for example, in those instances where religion prohibits the consumption of meat products. Layers of lipid, hydrocarbon, mineral and vegetable oils are also suitable although some rancidity may develop after prolonged periods of time when certain vegetable oils are used.

Although the percentages and the ratios of the nitrite and different amino acids may be varied in order to obtain varying degrees of flavor, certain ranges have been found to be preferable. For example, the ratio of the nitrite to the amino acid mixture may be varied from about 1:44 to 1:26,400 in order to obtain a more desirable result. Ideal results are obtained with a ratio of from 1:220. The amount of nitrite present in the solution may vary from about 1 p.p.m to 600 p.p.m and for best results should be approximately 120 p.p.m. In addition, the amino acids used, may be varied within wide limits. For example, when using the 7 amino acids previously specified, a preferred solution should contain 0.1–10.0 parts by weight of each of the amino acids.

In order to obtain desirable results with the present invention, it has been found necessary to hold the reaction solution at room temperature for at least about 24 hours after the reaction has occurred. The ultimate flavor has been found to develop after a holding period of about 72 hours. Holding of the solution longer than 72 hours does not produce any noticeable improvement in the flavor. However, the only upper limit on the holding period appears to be the difficulty experienced in the development of some rancidity in those instances where certain vegetable oils are employed.

Although sodium nitrite is taught as the nitrite used in the following examples, various other edible nitrites, such as potassium nitrite and calcium nitrite, are also applicable in the present invention.

The oil layer used in the present invention may be combined with the reaction solution after completion of the reaction, or may be removed. In the case of mineral oil, however, it is desirable to remove the oil layer after completion of the reaction.

The following examples are given to illustrate the method of the present invention. It should be understood, however, that the invention is not limited to these examples.

EXAMPLE I

|  | Grams |
|---|---|
| Aspartic acid | 0.7 |
| Lysine | 1.0 |
| Histidine | 6.0 |
| Glutamic acid | 2.2 |
| Valine | 0.8 |
| Proline | 1.9 |
| Cysteine monohydrochloride | 0.6 |
| Sodium nitrite | 0.06 |

The above substances in the amounts given were dissolved in 500 milliliters of distilled water, and the pH of this solution was adjusted to 6 with 5 normal NaOH. Five milliliters of mineral oil was then added to 234 milliliters of the above solution, and the resultant mixture was autoclaved for 1.5 hours at 15 lbs. pressure and 120° C. The resultant reaction product along with the overlying mineral oil was then cooled and held at room temperature (75° F.) for approximately 24 hours.

The golden brown solution which resulted was separated from the oil layer and treated with 1 gram of NaCl per 100 milliliters of the solution and heated to boiling. The flavor emitted was identical to that of bouillon. When the solution was added to beef fat, a product resulted which had the aroma and flavor typical of boiled steak.

EXAMPLE II

The procedure of Example I was used with the exception that cottonseed oil was substituted for the mineral oil in the above example. The results obtained were substantially as those obtained in Example I.

EXAMPLE III

A mixture of 0.377 gram of each of the 7 amino acids listed in Example I was reacted with 0.012 gram of sodium nitrite and 3 ml. of mineral oil by the procedure described in Eaxmple I. The reaction mixture was then aged for 72 hours at approximately room temperature, resulting in a broth-like flavor.

EXAMPLE IV

A mixture of amino acids was prepared by refluxing 40 grams of sheep globin with 400 milliliters of 6 normal hydrochloric acid for 24 hours. The major portion of the hydrochloric acid was then removed by vacuum distillation and 5 normal sodium hydroxide was added in order to adjust the pH to 5. The volume of the solution was then increased to 1 liter by the addition of distilled water. A 250 milliliter sample of the resultant solution was then purified by filtration with activated charcoal, resulting in a solution which was clear, odorless and tasteless.

Samples of sodium nitrite weighing 12 milligrams each were then added to 80 milliliter samples of both the filtered and unfiltered solutions. The pH was then adjusted to 6 by the addition of sodium hydroxide and the solutions were covered by the addition of 3 milliliters of cottonseed oil, mineral oil or melted beef fat. The samples were then autoclaved for 1.5 hours at 120° C. and 15 lbs. pressure. After autoclaving, the samples were held at approximately room temperature for 72 hours. It was found that the filtered solution had a definite bouillon flavor as opposed to a somewhat vegetable-like flavor in the unfiltered samples.

Obviously, many modifications and variations of the invention as hereinbefore set forth may be made without departing from the spirit and the scope of this invention, and therefore only such limitations should be imposed as are indicated in the appended claims.

I claim:

1. A process for preparing a synthetic meat flavor which comprises: mixing an edible nitrite with a mixture of amino acids, and reacting the mixture under a semi-impermeable layer of an oil.

2. A process for preparing a synthetic meat flavor which comprises: dissolving an edible nitrite with a mixture of amino acids; adjusting the pH of the solution to from about 5 to about 8; covering the solution with a semi-impermeable layer of an oil; and heating the mixture at a temperature and pressure combination sufficient to produce a reaction between the nitrite and the amino acids.

3. A process for preparing a synthetic meat flavor which comprises: dissolving a nitrite with a mixture of amino acids; adjusting the pH of the solution to from about 5 to about 8; adding to the solution an edible oil; heating the mixture at a temperature and pressure combination sufficient to obtain a reaction; and holding the reaction mixture at approximately room temperature for at least 24 hours.

4. The product prepared by the process of claim 3.

5. A process for preparing a synthetic meat flavor which comprises: dissolving one part of a nitrite with a mixture of amino acids comprised of aspartic acid, lysine, histidine, glutamic acid, valine, proline and cysteine; adjusting the pH of the solution to from about 5 to about 8; covering the solution with an edible oil; heating the mixture at a temperature and pressure combination sufficient to obtain the desired reaction; and holding the reaction mixture at approximately room temperature for at least 24 hours.

6. A process for preparing a synthetic meat flavor which comprises: dissolving one part of a nitrite with a mixture of amino acids comprised of aspartic acid, lysine, histidine, glutamic acid, valine, proline and cysteine; adjusting the pH of the solution to from about 5 to about 8; adding to the solution an oil selected from the group consisting of mineral and vegetable oil; heating the mixture to at least a temperature and pressure combination of about 120° C. and 15 pounds pressure; and holding the reaction mixture at approximately room temperature for at least 24 hours.

7. A process for preparing a synthetic meat flavor which comprises: preparing a solution of the following in approximately the parts stated:

|  | Parts by weight |
|---|---|
| Sodium nitrite | 0.0002–1.4 |
| Aspartic acid | 0.1–10.0 |
| Lysine | 0.1–10.0 |
| Histidine | 0.1–10.0 |
| Glutamic acid | 0.1–10.0 |
| Valine | 0.1–10.0 |
| Proline | 0.1–10.0 |
| Cysteine | 0.1–10.0 | adjusting the pH to from about 5 to about 8; covering the solution with an edible oil; heating the solution for at least 0.5 hour at a temperature and pressure combination equal to at least about 120° C. and 15 pounds pressure; and holding the mixture for at least 24 hours after completion of the reaction.

8. A composition of matter comprising the reaction product of the following materials in approximately the parts stated:

| | Parts by weight |
|---|---|
| Sodium nitrite | 0.0002–1.4 |
| Aspartic acid | 0.1–10.0 |
| Lysine | 0.1–10.0 |
| Histidine | 0.1–10.0 |
| Glutamic acid | 0.1–10.0 |
| Valine | 0.1–10.0 |
| Proline | 0.1–10.0 |
| Cysteine | 0.1–10.0 |

References Cited by the Examiner

UNITED STATES PATENTS 2,918,376  12/1959  May et al. _____ 99—140
2,934,436  4/1960   May et al. _____ 99—140
2,934,437  4/1960   Morton et al. _____ 99—140

HYMAN LORD, *Primary Examiner.*

H. H. KLARE, *Assistant Examiner.*